UNITED STATES PATENT OFFICE.

OTTO SCHOTT, OF JENA, GERMANY, ASSIGNOR TO THE FIRM OF SCHOTT & GEN., OF JENA, GERMANY.

GLASS.

1,143,732.     Specification of Letters Patent.     Patented June 22, 1915.

No Drawing.     Application filed December 10, 1914. Serial No. 876,556.

*To all whom it may concern:*

Be it known that I, OTTO SCHOTT, a citizen of the German Empire, residing at Jena, Germany, have invented a new and useful Glass, of which the following is a specification.

Further investigations regarding the glass protected by Patent No. 1,130,767 have shown, that a glass capable of withstanding chemical influences may also be obtained, if the lime be wholly or in part replaced by magnesia, zinc oxid or baryta, the proportions being so chosen that the place of a part by weight of lime is always taken by an equivalent quantity of one of the said substitute substances or of several of them. While no other glass-forming components are employed for the new kind of glass, of course the addition of a small quantity of one or more other substances having some such secondary purpose as a coloring of the glass is not excluded.

The following table contains six examples. Example I gives the composition of a kind of glass according to the above patent, while examples II to VI give the composition of new kinds of glass. All the examples contain the same percentages respectively of alkali, boracic acid and alumina; the 3% of lime of example I are replaced in example II by the equivalent quantity of magnesia (2.2%), in example III by the equivalent quantity of zinc oxid (4.3%) and in example IV by the equivalent quantity of baryta (8.2%). In example V 2% of lime are retained, while 1% of lime is replaced by the equivalent quantity of magnesia (0.7%), and in example VI the proportion of lime of example I is replaced by magnesia and zinc oxid (1.1% and 2.1%). The proportion of silicic acid in examples II to VI is partly greater and partly less than in example I.

| | I. | II. | III. | IV. | V. | VI. |
|---|---|---|---|---|---|---|
| Alkali | 13 | 13 | 13 | 13 | 13 | 13 |
| Boracic acid | 10 | 10 | 10 | 10 | 10 | 10 |
| Lime | 3 | | | | 2 | |
| Magnesia | | 2.2 | | | 0.7 | 1.1 |
| Zinc oxid | | | 4.3 | | | 2.1 |
| Baryta | | | | 8.2 | | |
| Alumina | 12 | 12 | 12 | 12 | 12 | 12 |
| Silicic acid | 62 | 62.8 | 60.7 | 56.8 | 62.3 | 61.8 |

I claim:

Glass containing at least 50 per cent. silicic acid and having as its other glass-forming components alumina 4 to 15 per cent., boracic acid 5 to 15 per cent., alkali 4 to 14 per cent., magnesia at most 7.8 per cent., zinc oxid at most 15.9 per cent., baryta at most 30 per cent. and lime, the total percentage of lime, magnesia, zinc oxid and baryta being a quantity representing the equivalent of from 3 to 11 per cent. of lime, the total percentage of alumina, lime and that quantity of lime, which would represent the equivalent of the percentages of magnesia, zinc oxid and baryta being at least half and at most five times that of the boracic acid and the total percentage of magnesia, zinc oxid and baryta being greater than zero.

OTTO SCHOTT.

Witnesses:
PAUL KRUGER,
RICHARD HAHN,